UNITED STATES PATENT OFFICE.

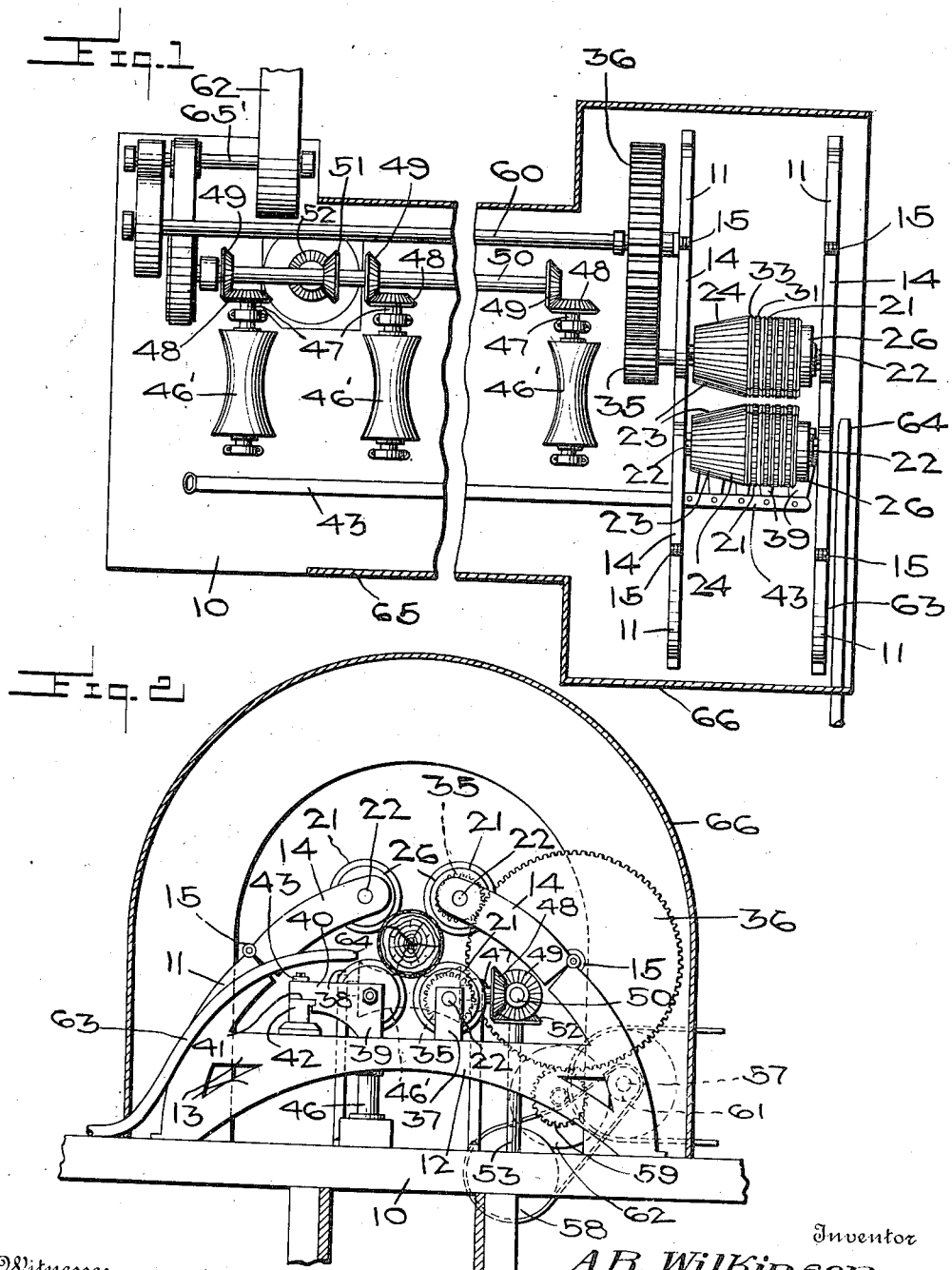

ALBERT R. WILKINSON, OF LEBANON, NEW HAMPSHIRE.

BARK-REMOVING PROCESS.

966,503.

Specification of Letters Patent.

Patented Aug. 9, 1910.

Application filed February 15, 1909. Serial No. 477,917.

*To all whom it may concern:*

Be it known that I, ALBERT R. WILKINSON, a citizen of the United States, residing at Lebanon, in the county of Grafton and State of New Hampshire, have invented certain new and useful Improvements in Bark-Removing Processes, of which the following is a specification.

This invention relates to a process in the art of making wood pulp.

In the accompanying drawings, Figure 1 shows a fragmentary top view and Fig. 2 an end view of a machine employed in carrying out my process.

In the manufacture of wood pulp, it is quite desirable that in removing the bark which forms a by-product, as little of the wood fiber be removed as possible. Spruce timber is almost exclusively used in the manufacture of wood pulp, and as spruce logs are almost universally of irregular shape in cross section, as are most logs, it is a problem of no little importance to remove the bark with as little fiber as possible.

In my process, I yieldingly hold, rotate and advance, within a suitable casing, the log to be treated. While being yieldingly held, and advanced, I subject the log to a cutting action, so that the bark is provided with a narrow incision which transversely enters the bark. At the same time the log is advanced so that the bark is given a spiral incision. Simultaneously I subject the log to a second cutting action, in that I incise the log by means of a transversely or obliquely entering incision, which as the log advances, is also in the form of a spiral. The two incisions are thus within the bark in the form of a right-angle, though the two incisions do not meet, but extend sufficiently deep to break the more brittle bark. At the same time that the bark is being incised or rossed, I subject the same to the action of a fluid, such as water or steam, under a high pressure, so that the fluid strikes the incised bark with an impact sufficient to force away the bark. The fiber being stringy and stronger is able to withstand the shock of the fluid pressure, so that the bark alone is removed.

By means of my process a large amount of wood is saved, while the bark is effectively removed from the log.

It is of course understood that logs other than spruce, may be treated, to free them of bark.

In the accompanying drawings, I show a machine employed in carrying out my process, and in which the numeral 10 designates a suitable base upon which there is mounted a case web frame 11 of preferably semicircular form. The frame 11 is forked as at 13 and carries at each upper end the arms 14 which are hinged at 15 and which form a continuation of the frame 11. In the upper ends of the arms 14 are journaled cutter rolls 21 which are adapted to be raised as occasion requires as hereinafter described. The rolls 21 comprise spindles 22 carrying integrally formed conical sections 23 and having pluralities of longitudinally disposed or cutting ridges 24 formed upon their peripheries. The opposite ends of the spindles 22 support the members 26. Held upon the spindles 22 are the cutters 31, which have a plurality of transverse blades 32 formed upon their peripheries which when placed upon the spindles 22 have the same position as the longitudinal blades 24. Cutters 33 are also provided for the rolls 21 which differ from the cutters 31 in so much as the cutting edge 34 is peripheral and not disposed transversely upon the cutters. The cutters 31 and 33 are alternately slipped upon the spindles 22 and are held in position by the members 26. Mounted upon the outer end of the spindles 22 is a pinion 35 meshing with a gear 36 which rotates said roll 21. Two of the rolls 21 are mounted in the ends of arms 14 while a third roll 21 is mounted in a journal 37 which is carried upon the upper face of the beam 12 directly beneath the journal end of the arm 14.

A plurality of guiding and cutting disks 38 are separately carried in pivotally mounted journals 39 carrying a series of backwardly extending arms 40. The ends of the arms 40 travel on a runway 42. An operating lever 43 is pivoted to the arms 40 at their outer ends at equidistant points, which arrangement disposes said arms 40 in parallel. The journals 39 have downwardly extending spindles which are rotatably mounted in vertical bearings 46. Toward the forward end of the machine the disk cutters 38 are reduced in diameter to register with the conical portion 23 of the roller 21. The disks 38 are adapted to be turned in different planes for the purpose of regulating the feed of the log when passing between the rolls 21. A plurality of concave rollers 46' are horizontally mounted at the entrance of the machine over which the logs are passed as they are fed to the reduced ends of the rolls 21 and feed regulating disks 38. These rollers 46' are mounted upon shafts 47 carrying gears 48 which mesh with gears 49 carried by the power shaft 50. The gear 36 is secured to the driving shaft 60. Both shafts 50 and 60 are driven by means of main shaft 65'.

For the purpose of removing the bark when it is loosened from the log a jet of water is employed. The water enters the machine through the pipe 63 and out of the nozzle 64 under a heavy pressure.

The whole apparatus is inclosed in a metallic casing 65 which is enlarged at one end as at 66 adapted to confine the water as it passes over the log and conveys the refuse out of the opposite end of the machine.

In operation, logs are introduced into the machine over the rollers 46 and are fed to the tapering ends of the rolls 21. The log being engaged by the rolls is given a rotary motion and is drawn through the rollers by action of the disks 38. The disks 38 are turned into a plane at an acute angle to the axis of the log and thereby a screw feeding action operates the longitudinal movement of the log. The rolls being in operation the log is cut transversely and also longitudinally chopping the bark into small fragments. Water is then admitted to the machine under a heavy pressure which is governed by the adhering qualities of the barks of various woods, when the small fragments of bark will be forced from the wood and carried off from the machine. If a log of larger than usual diameter is to be passed through the machine then the rolls 21 are raised which act enlarges the space between the rolls for the admission of the log. By changing the angle of the disks 38 by the lever 43 the speed of the log is changed as it passes through the rolls.

Having thus described my said invention, what I claim as new and desire to obtain by United States Letters Patent is:

1. A step in the process of making wood pulp, which consists in comminuting the bark, while subjecting the log to fluid action under pressure.

2. A step in the process of making wood pulp, which consists in yieldingly holding a log and comminuting the bark while subjecting the log to fluid action under pressure.

3. A step in the process of making wood pulp, which consists in yieldingly holding, advancing and rotating a log, and comminuting the bark and subjecting the log to the action of a fluid under pressure.

4. A step in the process of making wood pulp, which consists in yieldingly holding, advancing and rotating a log, and simultaneously subjecting the log to a spiral transverse cutting action and a spiral oblique cutting action.

5. The process of removing bark from a log, which consists in yieldingly rotating and advancing the log, simultaneously giving the log a transverse spiral and oblique spiral incision, and subjecting the log to a fluid under pressure, during the cutting action.

6. The process of removing bark from a log, which consists in circumferentially cutting the bark in spaced lines, and chopping the bark between the cuts, and subjecting the cut and chopped portions of the bark to the action of fluid under pressure.

In testimony whereof I affix my signature, in presence of two witnesses.

ALBERT R. WILKINSON.

Witnesses:
ERENA W. GATES,
M. D. COBLEIGH.